US012666333B2

(12) United States Patent
Teyeb et al.

(10) Patent No.: US 12,666,333 B2
(45) Date of Patent: Jun. 23, 2026

(54) METHODS AND APPARATUS FOR PERFORMING DUAL ACTIVE PROTOCOL STACK HANDOVER IN INTEGRATED ACCESS BACKHAUL IN WIRELESS COMMUNICATION SYSTEMS

(71) Applicant: Interdigital Patent Holdings, Inc., Wilmington, DE (US)

(72) Inventors: Oumer Teyeb, Montreal (CA); Martino Freda, Laval (CA); Yugeswar Deenoo Narayanan Thangaraj, Chalfont, PA (US); Tuong Hoang, Montreal (CA); Jaya Rao, Montreal (CA); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 327 days.

(21) Appl. No.: 18/032,622

(22) PCT Filed: Oct. 19, 2021

(86) PCT No.: PCT/US2021/055525
§ 371 (c)(1),
(2) Date: Apr. 19, 2023

(87) PCT Pub. No.: WO2022/086905
PCT Pub. Date: Apr. 28, 2022

(65) Prior Publication Data
US 2023/0413149 A1 Dec. 21, 2023

Related U.S. Application Data

(60) Provisional application No. 63/094,072, filed on Oct. 20, 2020.

(51) Int. Cl.
*H04W 36/30* (2009.01)
*H04B 17/309* (2015.01)
(Continued)

(52) U.S. Cl.
CPC .......... *H04W 36/30* (2013.01); *H04B 17/309* (2015.01); *H04W 36/00692* (2023.05); *H04W 36/0085* (2018.08); *H04W 40/22* (2013.01)

(58) Field of Classification Search
CPC .......... H04W 36/30; H04W 36/00692; H04W 36/0085; H04W 40/22; H04B 17/309
See application file for complete search history.

(56) References Cited

U.S. PATENT DOCUMENTS

2011/0280127 A1 11/2011 Raaf et al.
2014/0016542 A1 1/2014 Ulupinar et al.
(Continued)

FOREIGN PATENT DOCUMENTS

WO WO 2011019975 A1 2/2011
WO WO 2020090988 A1 5/2020
WO WO 2020165280 A1 8/2020

OTHER PUBLICATIONS

Third Generation Partnership Project (3GPP), "Technical Specification Group Radio Access Network; NR; Backhaul Adaptation Protocol (BAP) Specification (Release 16)", 3GPP TS 38.340, V16.2.0, Sep. 2020, 22 pages. (Year: 2020).*
(Continued)

*Primary Examiner* — Austin J Moreau
(74) *Attorney, Agent, or Firm* — Mark D. Pratt

(57) ABSTRACT

The disclosure pertains to methods and apparatus for performing handover by a relay Wireless Transmit/Receive Unit (WTRU) from a source parent WTRU to a target parent WTRU in a wireless network comprising: obtaining uplink data determining, a channel quality for a first link between
(Continued)

700 →

710
OBTAIN UPLINK DATA DETERMINING, A CHANNEL QUALITY FOR A FIRST LINK BETWEEN THE RELAY WTRU AND THE SOURCE PARENT WTRU, AND A CHANNEL QUALITY FOR A SECOND LINK BETWEEN THE RELAY WTRU AND THE TARGET PARENT WTRU

720
SEND, THE UPLINK DATA VIA THE FIRST LINK AND THE SECOND LINK BASED ON ANY OF: (1) THE DETERMINED CHANNEL QUALITY FOR THE FIRST LINK, (2) THE DETERMINED CHANNEL QUALITY FOR THE SECOND LINK, AND/OR (3) LOAD CONDITIONS

730
SEND, TO A CHILD WTRU SERVED BY THE RELAY WTRU VIA A THIRD LINK, INFORMATION INDICATING A HANDOVER OF THE RELAY WTRU FROM THE SOURCE PARENT WTRU TO THE TARGET PARENT WTRU the relay WTRU and the source parent WTRU, and a channel quality for a second link between the relay WTRU and the target parent WTRU; sending, the uplink data via the first link and the second link based on any of: (1) the determined channel quality for the first link, (2) the determined channel quality for the second link, and/or (3) load conditions; and sending, to a child WTRU served by the relay WTRU via a third link, information indicating a handover of the relay WTRU from the source parent WTRU to the target parent WTRU.

20 Claims, 14 Drawing Sheets

(51) Int. Cl.
*H04W 36/00* (2009.01)
*H04W 40/22* (2009.01)

(56) References Cited

U.S. PATENT DOCUMENTS

| | | | |
|---|---|---|---|
| 2020/0100124 A1 | 3/2020 | Hampel et al. | |
| 2021/0385714 A1* | 12/2021 | Paladugu | H04W 36/0009 |
| 2022/0086936 A1* | 3/2022 | Akl | H04W 76/15 |
| 2023/0269662 A1* | 8/2023 | You | H04L 1/00 |
| | | | 370/328 |
| 2023/0318941 A1* | 10/2023 | Rune | H04L 41/5009 |
| | | | 370/252 |

OTHER PUBLICATIONS

Third Generation Partnership Project (3GPP), "Technical Specification Group Radio Access Network: NR; NR and NG-RAN Overall Description; Stage 2 (Release 16)", 3GPP TS 38.300 V16.2.0, Jul. 2020, 148 pages.

Third Generation Partnership Project (3GPP), "Technical Specification: 5G; NR; Radio Resource Control (RRC); Protocol Specification (Release 16)", 3GPP TS 38.331 V16.2.0, Nov. 2020, 921 pages.

Third Generation Partnership Project (3GPP), "Technical Specification Group Radio Access Network; NR; Backhaul Adaptation Protocol (BAP) Specification (Release 16)", 3GPP TS 38.340, V16.2.0, Sep. 2020, 22 pages.

Third Generation Partnership Project (3GPP), "Technical Specification Group Radio Access Network: NR; Study on Integrated Access and Backhaul; (Release 16)", 3GPP TR 38.874 V16.0.0, Dec. 2018, 111 pages.

* cited by examiner

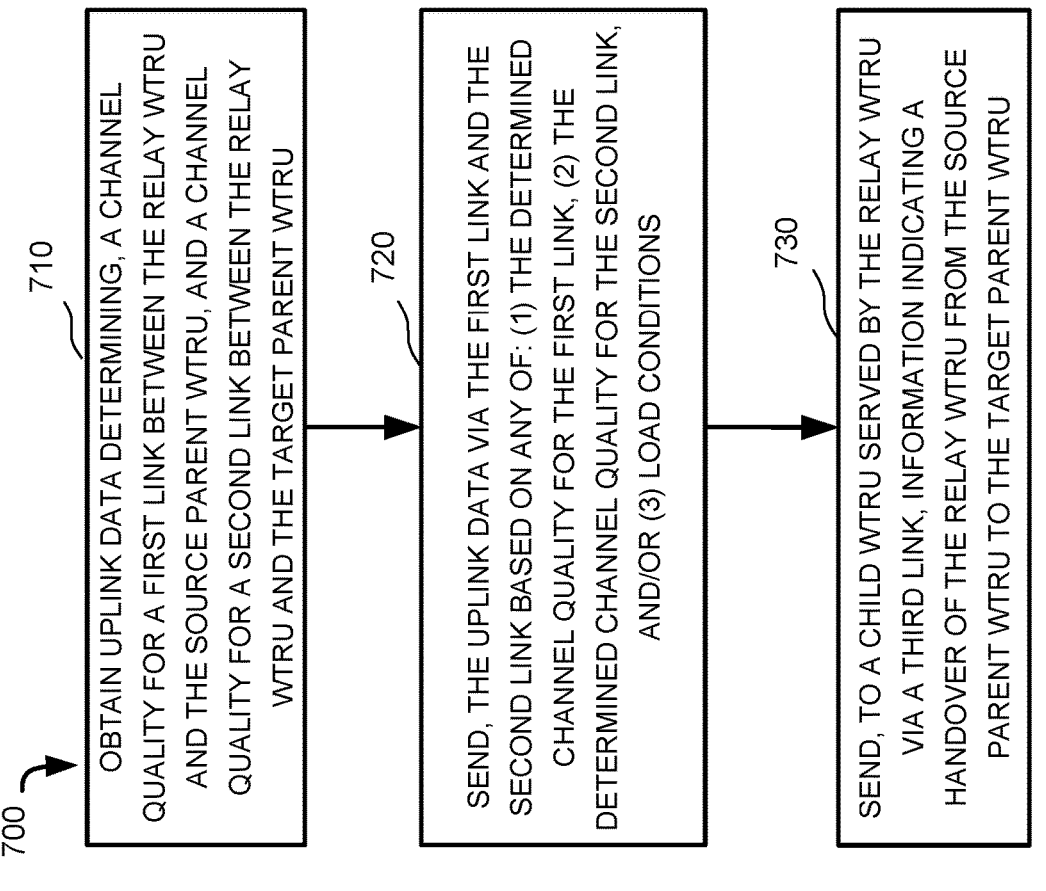

710 OBTAIN UPLINK DATA DETERMINING, A CHANNEL QUALITY FOR A FIRST LINK BETWEEN THE RELAY WTRU AND THE SOURCE PARENT WTRU, AND A CHANNEL QUALITY FOR A SECOND LINK BETWEEN THE RELAY WTRU AND THE TARGET PARENT WTRU

720 SEND, THE UPLINK DATA VIA THE FIRST LINK AND THE SECOND LINK BASED ON ANY OF: (1) THE DETERMINED CHANNEL QUALITY FOR THE FIRST LINK, (2) THE DETERMINED CHANNEL QUALITY FOR THE SECOND LINK, AND/OR (3) LOAD CONDITIONS

730 SEND, TO A CHILD WTRU SERVED BY THE RELAY WTRU VIA A THIRD LINK, INFORMATION INDICATING A HANDOVER OF THE RELAY WTRU FROM THE SOURCE PARENT WTRU TO THE TARGET PARENT WTRU

RECEIVE, INFORMATION INDICATING A HANDOVER COMMAND

820

SEND, TO A CHILD WTRU OF THE RELAY WTRU, INFORMATION INDICATING A HANDOVER OF THE RELAY WTRU FROM THE SOURCE PARENT WTRU TO THE TARGET PARENT WTRU

800

910

TRANSMIT UPLINK DATA TO THE PARENT WTRU VIA A FIRST LINK

920

RECEIVE INFORMATION INDICATING A HANDOVER OF THE PARENT WTRU FROM A SOURCE GRANDPARENT WTRU TO A TARGET GRANDPARENT WTRU

930

RESPONSIVE TO THE RECEPTION OF THE INFORMATION INDICATING THE HANDOVER, TRANSMIT, UPLINK DATA TO A FURTHER PARENT WTRU VIA A SECOND LINK DURING THE HANDOVER

900

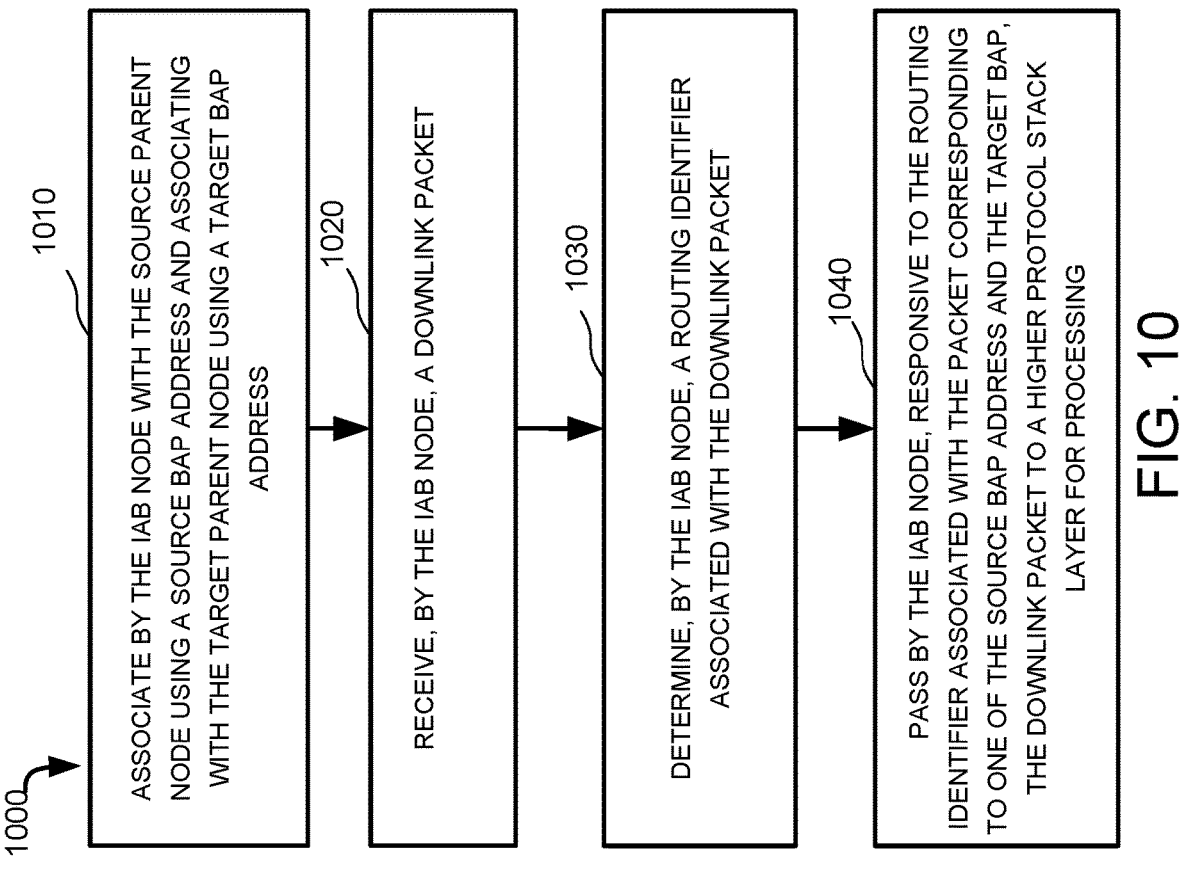

1000

1010

ASSOCIATE BY THE IAB NODE WITH THE SOURCE PARENT NODE USING A SOURCE BAP ADDRESS AND ASSOCIATING WITH THE TARGET PARENT NODE USING A TARGET BAP ADDRESS

1020

RECEIVE, BY THE IAB NODE, A DOWNLINK PACKET

1030

DETERMINE, BY THE IAB NODE, A ROUTING IDENTIFIER ASSOCIATED WITH THE DOWNLINK PACKET

1040

PASS BY THE IAB NODE, RESPONSIVE TO THE ROUTING IDENTIFIER ASSOCIATED WITH THE PACKET CORRESPONDING TO ONE OF THE SOURCE BAP ADDRESS AND THE TARGET BAP, THE DOWNLINK PACKET TO A HIGHER PROTOCOL STACK LAYER FOR PROCESSING

DETERMINE, BY A NODE OF THE NETWORK THAT IS A PARENT NODE TO A CHILD IAB NODET, TO INITIATE A DAPS HO AT THE CHILD NODE, WHEREIN THE DETERMINING IS BASED ON LOAD CONDITIONS AT THE CHILD IAB NODE AND LOAD CONDITIONS AT THE PARENT NODE

1120

TRANSMIT, BY THE PARENT NODE, THE DAPS HO COMMAND TO THE CHILD IAB NODE

METHODS AND APPARATUS FOR PERFORMING DUAL ACTIVE PROTOCOL STACK HANDOVER IN INTEGRATED ACCESS BACKHAUL IN WIRELESS COMMUNICATION SYSTEMS

CROSS-REFERENCE TO RELATED APPLICATIONS

The application is a U.S. National Stage Application under 35 U.S.C. § 371 of International Patent Application No. PCT/US2021/055525, filed Oct. 19, 2021, which claims the benefit of U.S. Provisional Patent Application No. 63/094,072, filed Oct. 20, 2020, which is hereby incorporated by reference herein.

FIELD OF THE INVENTION

Embodiments disclosed herein generally relate to wireless communications and, for example to methods and apparatus for performing Dual Active Protocol Stack (DAPS) handover (HO) in Integrated Access and Backhaul (IAB).

SUMMARY

IAB Enhancements to support DAPS HO are disclosed. Methods and apparatus for operation by a relay wireless transmit/receive unit (WTRU) for performing handover from a source parent WTRU to a target parent WTRU in a wireless network are provided. In one embodiment, a method includes obtaining uplink data determining, a channel quality for a first link between the relay WTRU and the source parent WTRU, and a channel quality for a second link between the relay WTRU and the target parent WTRU. The method further includes sending, the uplink data via the first link and the second link based on any of: (1) the determined channel quality for the first link, (2) the determined channel quality for the second link, and/or (3) load conditions. The method also includes sending to a child WTRU served by the relay WTRU via a third link, information indicating a handover of the relay WTRU from the source parent WTRU to the target parent WTRU.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein:

FIG. 10 is a system diagram illustrating an example radio access network (RAN) and an example core network (CN) that may be used within the communications system illustrated in FIG. 1A according to an embodiment;

FIG. 7 is a flowchart illustrating a representative method of performing a handover of an IAB node by a WTRU from a source parent node to a target parent node in a wireless network;

FIG. 10 is a flowchart illustrating a representative method of performing a handover of an IAB node from a source parent node to a target parent node in a wireless network.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

EXAMPLE NETWORKS FOR IMPLEMENTATION OF THE INVENTION

Figure 1A:
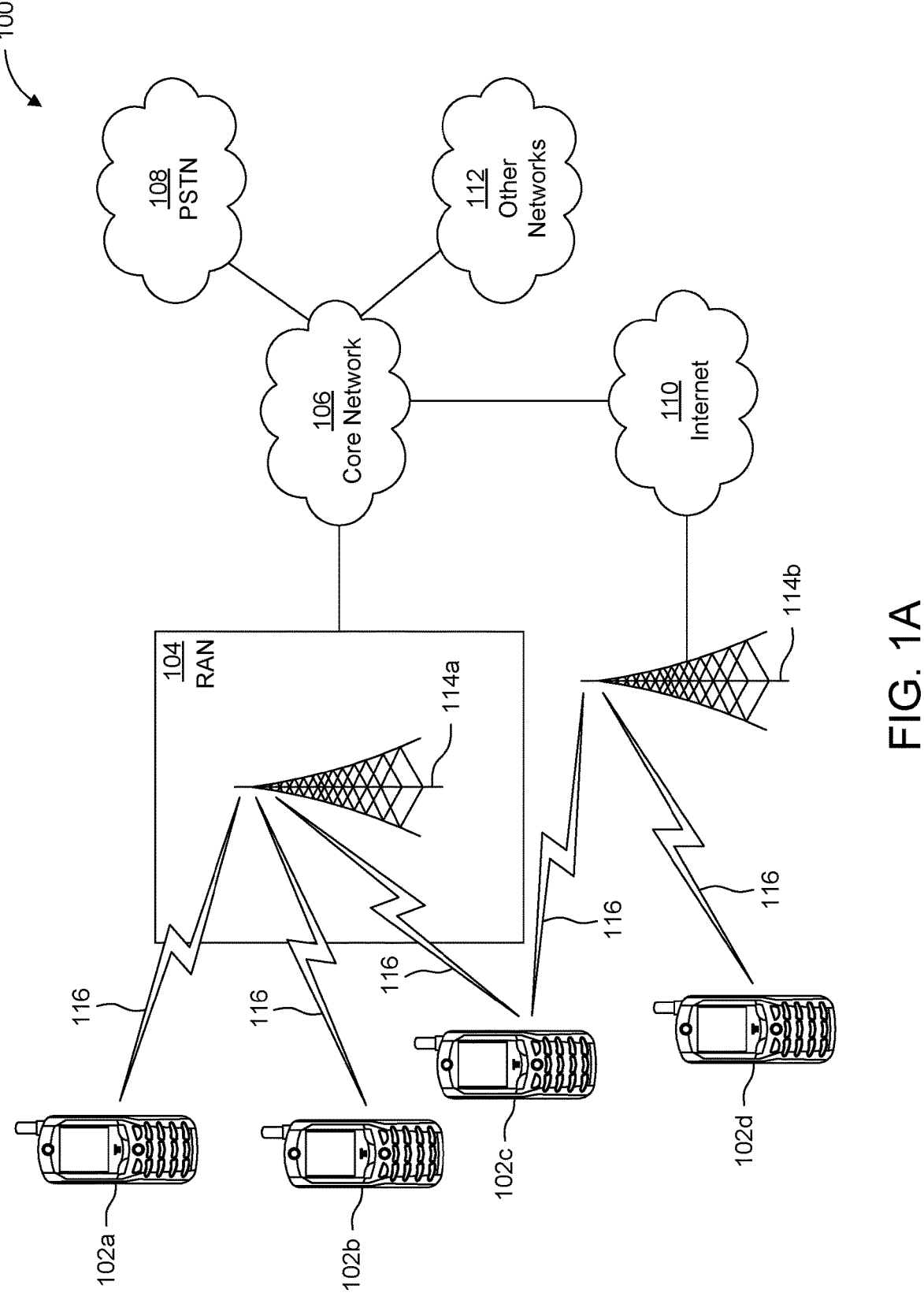
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, F DMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, VViMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
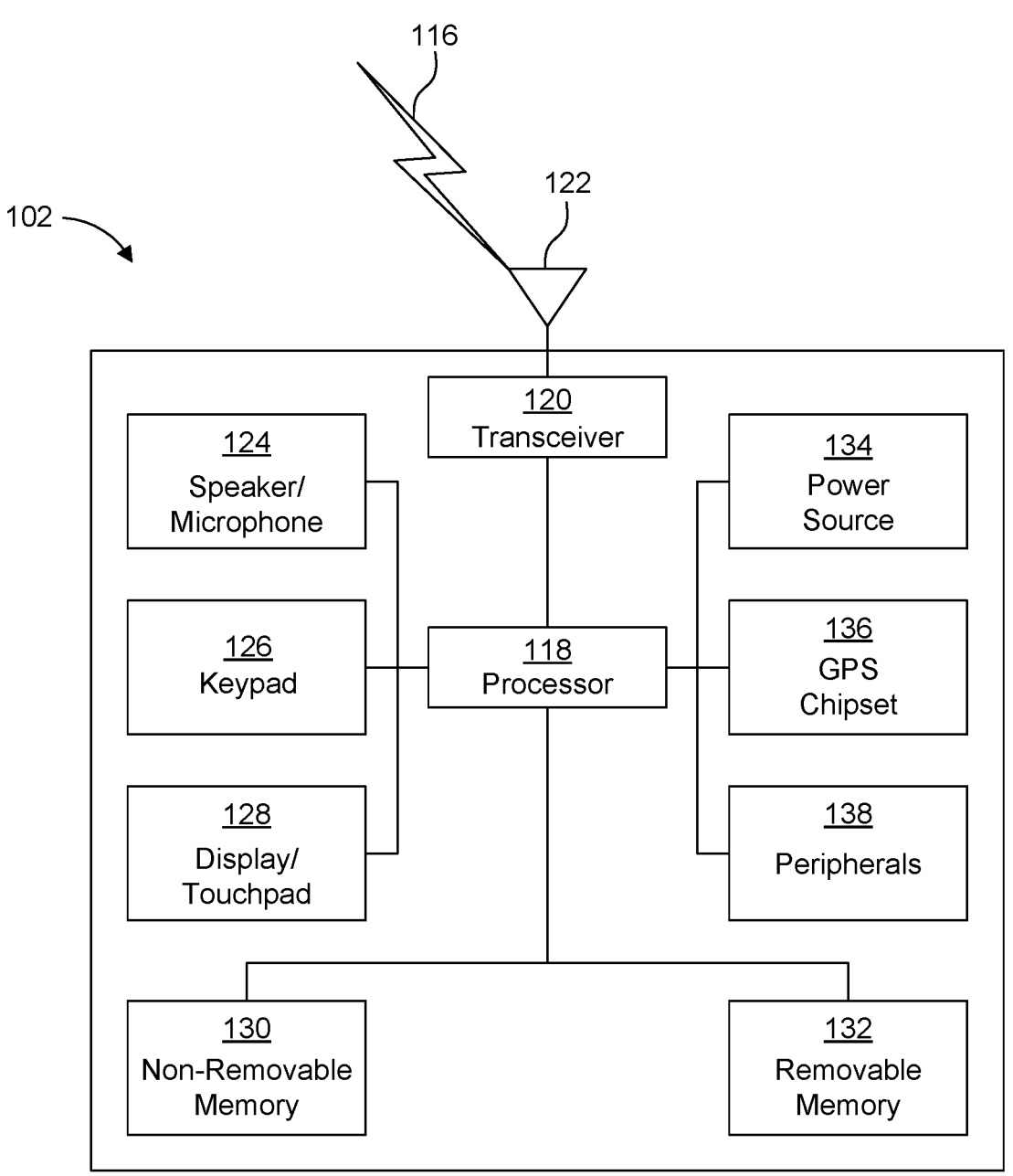
FIG. 1B is a system diagram illustrating an example WTRU that may be used within the communications system illustrated in FIG. 1A according to an embodiment.
Figure 1C:
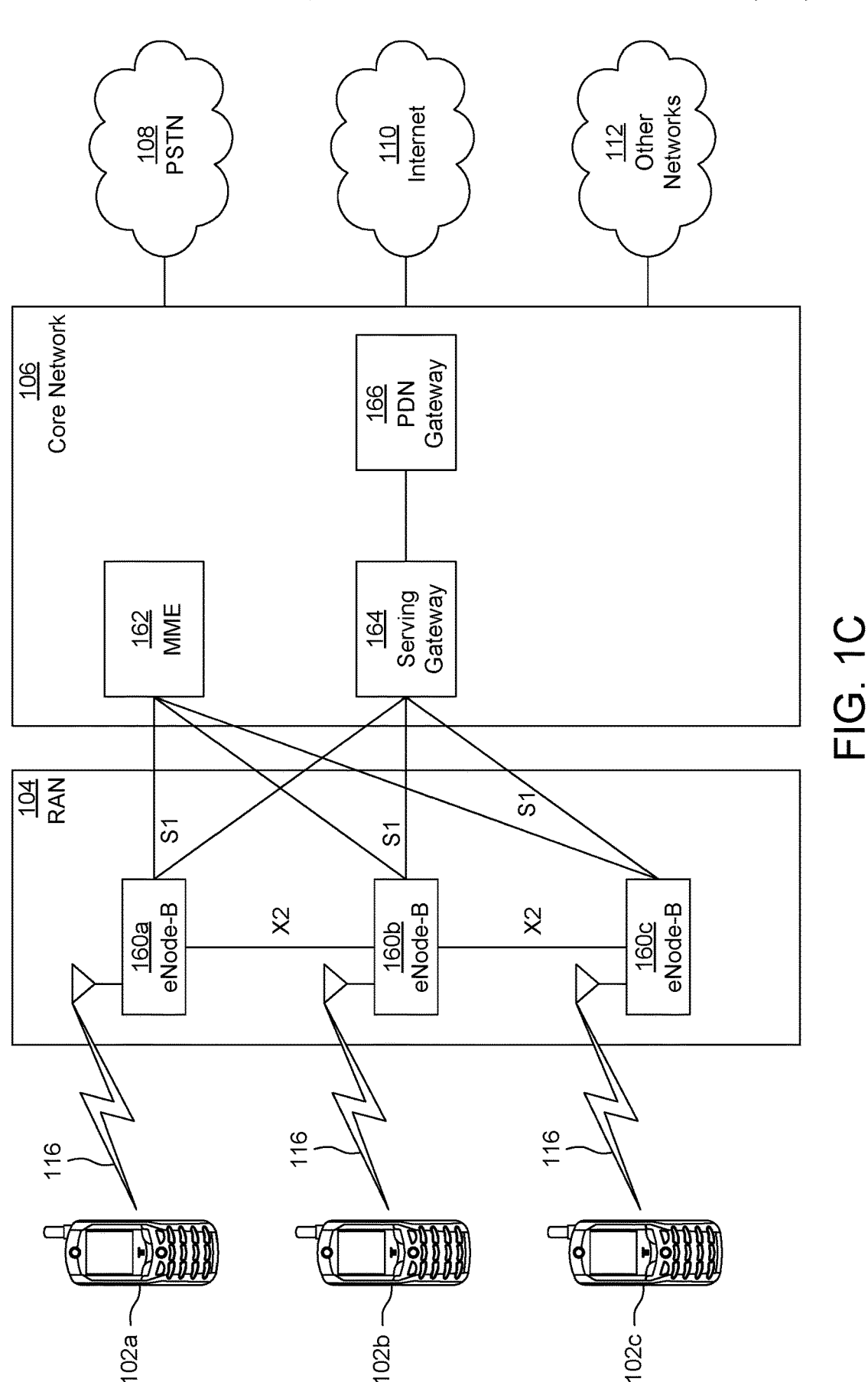
FIG. 1D is a system diagram illustrating a further example RAN and a further example CN that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 10, the eNode-Bs 160*a*, 160*b*, 160*c* may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
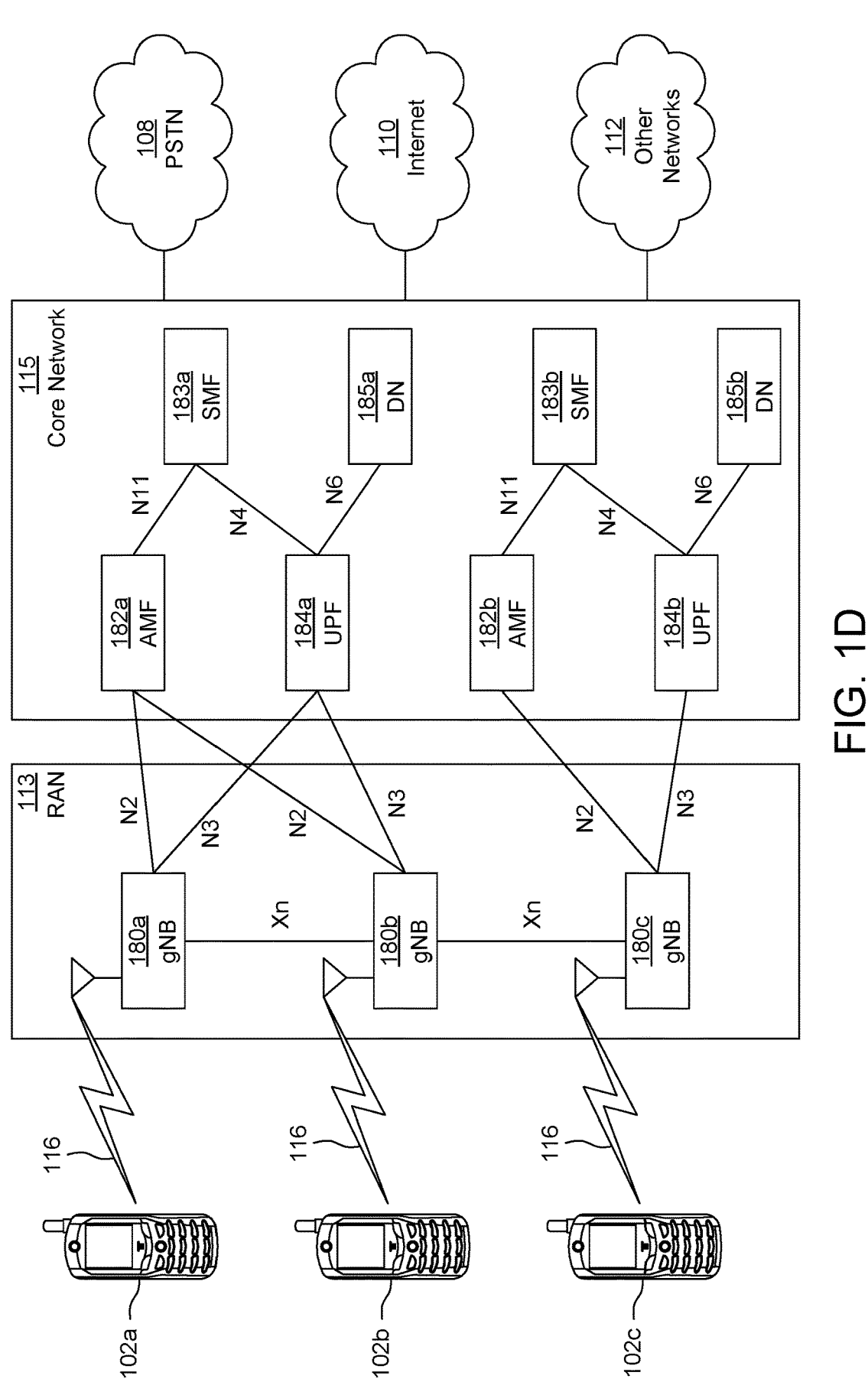

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DAPS in 3GPP Release 16

In 3GPP Release-16, the concept of Dual Active Protocol Stack (DAPS) Handover (HO) was introduced (for both LTE and NR) in order to reduce the interruption time during handover (which, for example, could range from 30 ms to 60 ms in LTE, depending on the handover scenario), thereby ensuring that the quality of highly delay-sensitive services will not be degraded because of mobility.

Figure 2:
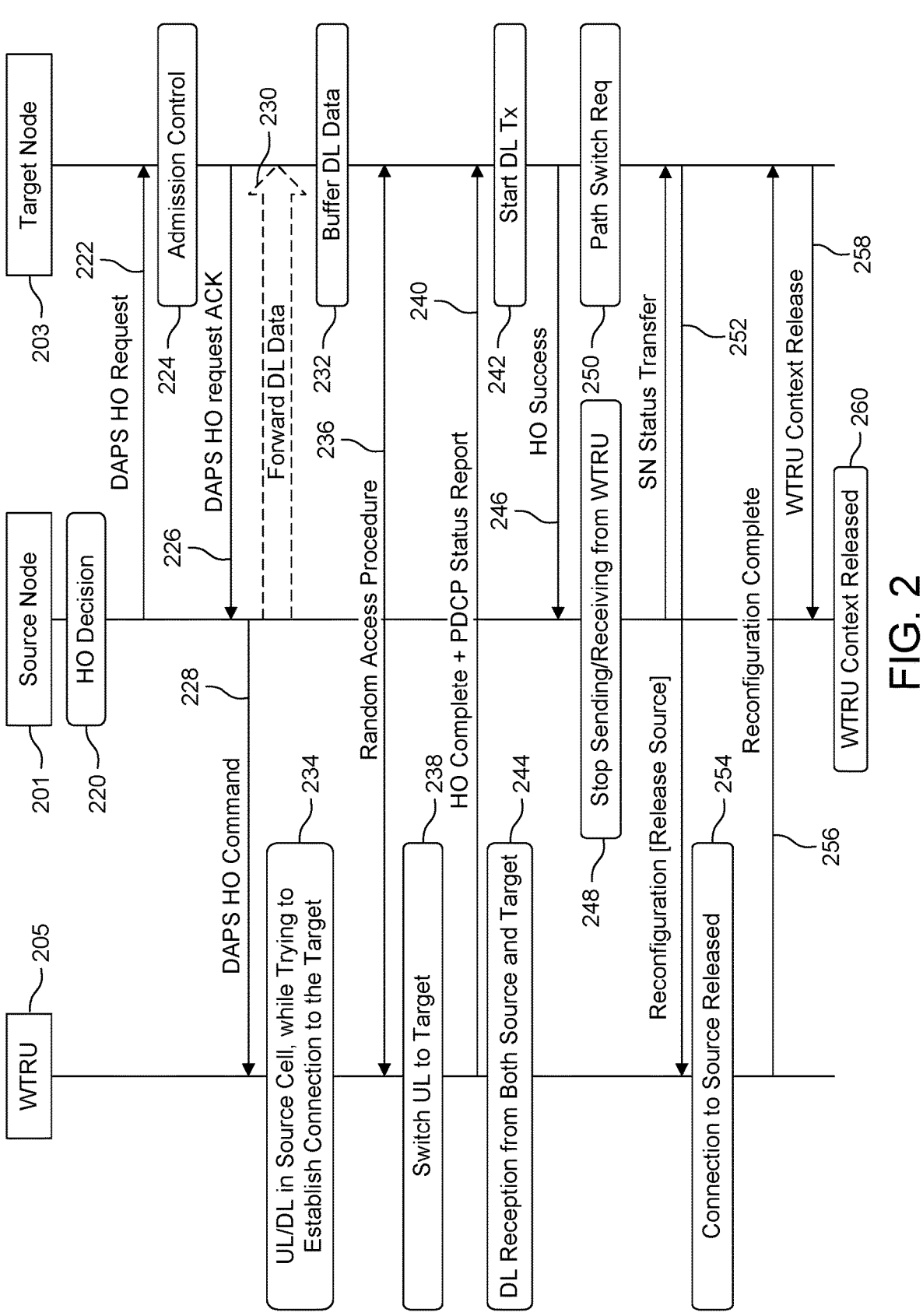
FIG. 2 is a signal flow diagram illustrating DAPS a HO procedure.

The DAPS HO procedure is illustrated in FIG. 2. The source node 201, (e.g., upon) deciding to perform a DAPS HO (220), may send a DAP HO request (222) to the target node 203. A DAPS HO request (222) may be a handover request that includes information regarding to which Dedicated Radio Bearers (DRBs) the DAPS HO may be applied (e.g., for example for some DRBs, normal HO can be applied). After performing admission control (224), the target node 203 may respond with a HO request acknowledgement (226).

The source node 201 may send a DAPS HO command (228) to a (e.g., relay) WTRU 205, for example an RRC Reconfiguration with reconfigurationWithSync, that may also contain an indication regarding which DRBs may be involved in DAPS HO. The source node 201 may continue normal operation for UL data (e.g., forwarding it to the core network (not shown)) and for DL (e.g., sending it to the WTRU 205 (not shown)), but may also (e.g., start) forwarding the DL data (230) toward the target node 203, which may buffer the data (232).

After (e.g., once) the WTRU 205 may have managed to perform random access with the target node 203 (234, 236), UL data transmission may be switched (238) to the target node 203, but DL reception may be still performed from the source node 201. The WTRU 205 may send an information indicating a HO complete (240), which may bean RRC Reconfiguration Complete message, to the target node 203, which may include the PDCP status report for those DRBs that may be configured for DAPS HO. The target node 203 may (e.g., start) send the buffered DL data to the WTRU 205 (242), for example, using the status information provided by the WTRU 205 to avoid the sending of duplicate packets (e.g., packets forwarded from the source node 201 but now indicated to have been received by the WTRU 205). In such a case, the WTRU 205 may receive DL data from the source node 201 and the target node 203 (238).

The target node 203 may indicate (e.g., transmit information indicating) the success of the handover to the source node 201 (246), after which the source node 201 may stop sending and/or receiving data to/from the WTRU 205 (248). The target node 203 may also initiate path switch towards the core (250), so that new DL data may be sent from the core network to the target node 203 instead of the source node 201 (not shown). The target node 203 may indicate (e.g., transmit information indicating) to the WTRU 205 that the DAPS HO may be finalized by sending, for example an RRC Reconfiguration message that may contain a daps-SourceRelease indicator (252), (e.g., upon which) the WTRU 205 may release the connection to the source node 201 (254) and/or may transmit a Reconfiguration Complete message to the target node 203 (256). The target node 203 may (e.g., also) send a context release message to the source node 201(258), for example, so that all the WTRU 205 context at the source node 201 may get released (260).

DAPS handover may be configured on a DRB level (e.g., normal PDCP/RLC/MAC procedures may be applied for the bearers not configured for DAPS handover) and a handover may be referred to as a DAPS handover if at least one bearer is configured for DAPS. The handover mechanism triggered by RRC may (e.g., require) operate the WTRU 205 at least to reset the MAC entity and/or re-establish RLC, except for DAPS handover, wherein, (e.g., upon) after reception of the handover command, the WTRU may:

Create a MAC entity for the target node 203.

Establish the RLC entity and/or an associated logical channel for the target node 203 for any (e.g., each) DRB configured with DAPS (hence the name dual protocol stack).

For the DRB configured with DAPS, reconfigure the PDCP entity with separate security and/or full robust header compression (ROHC) functions for source node 201 and/or target node 203 and/or may associate them with the RLC entities configured by the source node 201 and/or the target node 203.

Retain the rest of the source configurations, for example, until instructed to release the source.

Since the WTRU 205 may receive user data simultaneously from both the source node 201 and target node 203, the PDCP layer may be reconfigured to a common PDCP entity for the source node 201 and/or target node 203 user plane protocol stacks. For example, to secure in-sequence delivery of user data, PDCP Sequence Number (SN) continuation may be maintained throughout the handover procedure. In such a case, a common (for source node 201 and target node 203) re-ordering and duplication function may be provided in the single PDCP entity. Ciphering/deciphering and/or header compression/decompression may be handled separately in the common PDCP entity, for example, depending on the origin/destination of the DL/UL packet.

IAB in Release-16

IAB), where part of the wireless spectrum is used for the backhaul connection of base stations instead of fiber, may allow a more flexible and cheaper deployment of dense networks, for example, as compared to deployments where there is a dedicated fiber link to the base stations. In 3GPP specification a full-fledged, multi-hop, IAB solution that is based on a split architecture (e.g., Centralized Unit (CU) and Distributed Unit (DU) architecture) has been specified for NR. The user plane (UP) and control plane (CP) protocol architecture from 3GPP Technical Report 38.874 are reproduced in FIGS. 3 and 4 for reference.

Figure 3:
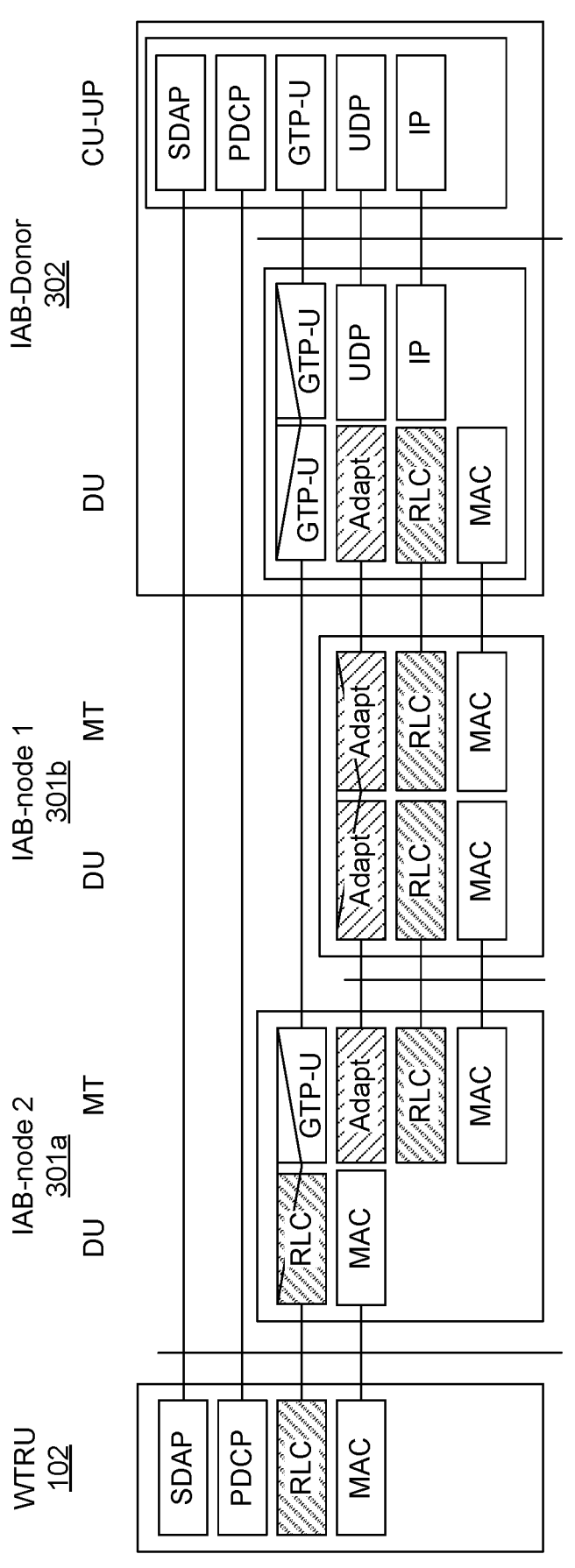
FIG. 3 is a diagram of a user plane protocol architecture for 5G.
Figure 4:
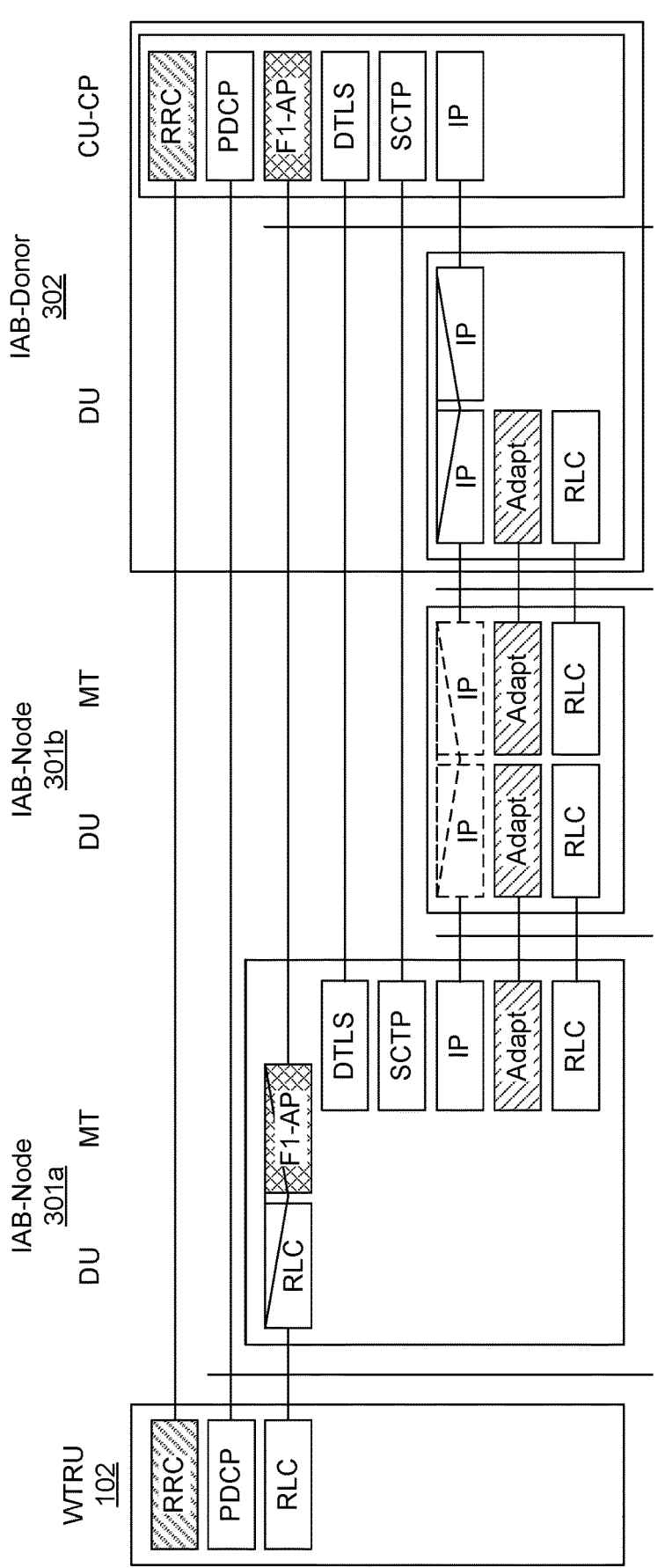
FIG. 4 is a diagram of a control plane protocol architecture for 5G.

FIGS. 3 and 4 illustrate protocol stack examples for WTRU 102 access using L2-relaying with adaptation layer (referred as Adapt). FIGS. 3 and 4 show example protocol stacks and do not preclude other possibilities. As illustrated in FIG. 3, adaptation layer placements may be above RLC layer. While RLC channels serving for backhauling include the adaptation layer, the adaptation layer may also be included in IAB-node access links (this part of the adaptation layer is shown with a partially dashed outline in FIG. 7). The adaptation layer may consist of sublayers. It is also possible that the GTP-U header is carried on top of the adaptation layer to carry end-to-end association between the IAB-node DU and the CU. It is possible, for example, that the GTP-U header becomes a part of the adaptation layer (not shown). As illustrated in FIG. 4, an IP header may be part of the adaptation layer or carried on top of the adaptation layer. One example is shown in part e of FIG. 6. In this example, the IAB-donor DU holds an IP routing function to extend the IP-routing plane of the fronthaul to the IP-layer carried by adapt on the wireless backhaul. In these examples, the adaptation layer resides on top of RLC and carries an IP-layer.

IAB Control Plane

The IAB node's protocol stack may contain two sides, the mobile termination (MT) part, which may be used to communicate with a parent node, and a DU part, which may be used to communicate with a child node or a normal WTRU 102. Both the UP and CP architectures may employ a routing/forwarding approach, for example inspired by IP networks, where any (e.g., each) IAB node 301 (301*a*, 301*b*) may be assigned an IP address that may be routable from a donor base station 302 (and associated L2 addresses), and intermediate IAB nodes 301*b* may forward the packets transparently based on route identifiers/destination addresses. The IAB node 301 may terminate the DU functionality and/or a base station (referred to as IAB-donor 302) may terminate the CU functionality. Thus, the IAB node 301 and donor CU, for example, regardless of how many hops apart they may be physically from each other, may form one logical base station unit employing CU/DU split architecture. The IAB node 301*a* serving a WTRU 102 may be referred to as the access IAB node while the nodes 301*b* between the IAB donor DU 302 and the access IAB node 301*a* may be known as intermediate IAB nodes. It should be noted that an IAB node 301 may play the role of both an access IAB node 301*a* (for example, for the WTRUs 102 that are directly connected to it) and an intermediate IAB node 301*b* (for example, for WTRUs 102 that may be served by its descendant IAB nodes).

Hop-by-hop RLC may be used between the IAB nodes 301, for example, instead of an E2E (End to End) RLC between the donor DU and the WTRU 102. An adaption layer, may be referred to as backhaul adaptation protocol (BAP), may be used to enable (e.g., efficient) multi-hop forwarding. The IAB-donor 302 may assign a unique L2 address (BAP address) to any (e.g., each) IAB node 301 that it may control. In case of multiple paths, multiple route IDs may be associated with any (e.g., each) BAP address. The BAP of the origin node (IAB-donor DU 302 for the DL traffic, and the access IAB node 301*a* for the UL) may add a BAP header to packets they may be transmitting, which may include a BAP routing ID (e.g., BAP address of the destination/source IAB node and the path ID). If a packet arrives that may have a BAP routing ID that may contain a BAP address that may equal to the IAB node's BAP address, it may determine (e.g., know) that the packet may be destined for it and, for example, passes it on to higher layers for processing (e.g., an F1-C/U message may be destined for the IAB node's DU, an F1-C message that may contain Signaling Radio Bearer (SRB) data for a WTRU 102 (e.g., directly) connected to the IAB node 301*a*, or an F1-U message that may contain DRB data for a WTRU 102 (e.g., directly) connected to the IAB node 301*a*). Otherwise, the IAB node 301 may employ routing/mapping tables to determine where to forward the data to. Any (e.g., each) IAB node 301 may have a routing table (for example configured by the IAB donor CU 302), that may contain the next hop identifier for any (e.g., each) BAP routing ID. Separate routing tables may be kept for the DL and/or UL direction, where the DL may be is used by the DU part of the IAB node 301, (e.g., while) the MT part of the IAB node 301 may use the UL table.

Backhaul (BH) RLC channels may be used for transporting packets between IAB nodes 301 (or between an IAB-donor DU 302 and an IAB node 301). A BH RLC channel configuration may contain the associated RLC and/or logical channel configuration. Either many-to-one (N:1) or one-to-one (1:1) mapping may be performed between WTRU radio bearers and BH RLC channels. N:1 mapping may multiplex several WTRU radio bearers into a single BH RLC channel based on specific parameters, such as QoS profile of the bearers, and may be suitable for bearers that do not have (e.g., very strict) requirements, such as best effort bearers.

The 1:1 mapping, on the other hand, may map any (e.g., each) WTRU radio bearer onto a separate BH RLC channel, and may be designed to ensure finer QoS granularity at WTRU radio bearer level. 1:1 mapping may be suitable for bearers with strict throughput and/or latency requirements, such as GBR (Guaranteed Bit Rate) bearers or VoIP bearers.

After (e.g., when) an IAB node 301 detects a BH radio link failure (RLF), the IAB node 301 may send a BH RLF indication (which may be a BAP control PDU) to its descendant nodes. After (e.g., upon) receiving such an indication from a parent node, the IAB node 301 may initiate procedures such as re-establishment to another parent or may pause transmission/reception with the concerned parent. The exact behavior on the reception of BH RLF indications may be left to IAB/network implementation in 3GPP specification.

In a multi-hop IAB network, data congestion may occur on intermediate IAB nodes 301*b*, which may lead to packet drops if left unresolved. Though higher layer protocols such as TCP may be used to assure reliability, TCP congestion avoidance and slow start mechanisms may be very costly to overall end-to-end performance (e.g., throughput degradation). In such a case (e.g., therefore), IAB networks may employ flow control. For the DL, both end-to-end (E2E) and hop-by-hop (H2H) flow control mechanisms may be available.

The DL E2E flow control may be based on the DL Data Delivery Status (DDDS) specified for CU/DU split architecture in 3GPP specification (TS 38.425). In DDDS, the DU (e.g., in the context of IAB networks, the DU part of the access IAB node 301*a*) may report (e.g., transmit information indicating) to the CU (e.g., in the context of IAB networks, the donor CU 302, specifically, the CU-UP) information such as the desired buffer size per DRB, desired data rate per DRB, the highest successfully delivered PDCP SN (Sequence Number), lost packets (e.g., not ACKed by the DU at RLC level), etc. In 3GPP specification, (e.g., only) access IAB nodes 301*a* perform DDDS (e.g., IABs may report (e.g., transmit information indicating) (e.g., only) information concerning the DRBs of the WTRUs 102 that they may be directly serving) and no information may be provided regarding the BH RLC channels.

For DL H2H flow control, an IAB node 301 may generate a flow control message (which may be also a BAP control PDU) after (e.g., when) its buffer load may exceed a certain level or after (e.g., when) it may receive a flow control polling message from a peer BAP entity (e.g., a child node). In 3GPP specification, the H2H flow control information may indicate the available buffer size and may be at the granularity of BH RLC channels (e.g., available buffer=value_1 for BH RLC channel #1, available buffer=value_2 or per BH RLC channel #2, etc.) or destination routing ID (e.g., available buffer=value_1 for destination routing ID=address1, available buffer=value2 for destination routing ID=address2, etc.). The IAB node 301 receiving the flow control message may use the information to control the traffic flow toward the sender (e.g., throttle or pause the traffic associated with certain BH RLC channel or/and destination if the flow control message indicated a low available buffer for the concerned traffic or increase the traffic flow if the flow control was indicating a high available buffer value). The exact actions taken on flow control and the configurations/values of thresholds and other parameters to trigger flow control message (e.g., buffer threshold values, polling timers, etc.) may be not specified, but may be left to IAB/network implementation.

In 3GPP specification, pre-emptive buffer status reporting (BSR) has been specified, where an IAB node 301 can trigger BSR to its parent node(s) even before (new) data has arrived in its UL buffer, based on the BSR that it has received from its child nodes or WTRUs 102, or scheduling grants it has provided to them (e.g., an indication of anticipated data). Apart from that, no specific enhancement related to UL flow control has been specified in 3GPP specification. That is, legacy NR mechanisms are applied where an IAB node 301 controls the flow of UL data from its children nodes and WTRUs 102 by the providing them with proper UL scheduling grants based on the BSR received from them. IAB nodes 301 may be (e.g., assumed to be) static nodes. However, handover of IAB nodes 301 (also referred to as migration or relocation) from one donor to another may be supported for load balancing and also for handling radio link failures (RLFs) due to blockage, e.g., due to moving objects, such as vehicles, seasonal changes (foliage), or infrastructure changes (new buildings). In 3GPP specification (e.g., only) intra-donor CU handover may be supported (e.g., the target and the source parent DUs of the IAB node 301 are controlled by the same IAB donor CU 302). However, in 3GPP Release-17, inter-donor CU handover may (e.g., expected to) be specified.

The 3GPP specification, though mainly focused on NR, may (e.g., also) support IAB connectivity via Multi-RAT Dual Connectivity (MR-DC). For example, an IAB node 301 may be connected to the network via EN-DC, where the master node may be an LTE node and/or the secondary node may be an NR node.

Another aspect of the 3GPP specification is that it may be completely transparent to WTRUs (e.g., from a WTRU's point of view, IAB nodes 301 may appear to be normal base stations).

An IAB node 301 may (e.g., transparently) forward the data belonging to the DRBs of the WTRUs 102 that it may be serving (or the WTRUs 102 that its descendants IAB nodes may be serving). As such, the DAPS mechanism, which may be configured at a DRB level, may be applied (e.g., only) for configuring DAPS HO of the bearers of the IAB MT (e.g., where the PDCP may be terminated at the IAB node). This means WTRU bearers that may be served by the migrating IAB node 301 or its descendant IAB nodes may not be able to benefit from DAPS HO, and thus may experience handover interruption after (e.g., when) the IAB node 301 migrates.

Figure 5:
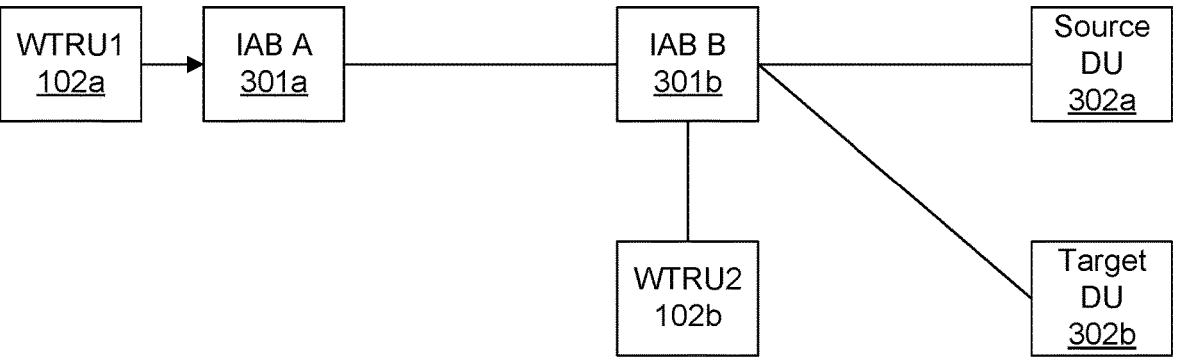
FIG. 5 is a signal flow diagram illustrating signaling associated with an IAB node performing a handover from the source distributed unit to the target distributed unit.

Consider the scenario illustrated in FIG. 5, where IAB node 301b may be performing a handover from the source DU 302a to the target DU 302b. (e.g., also assume that) WTRU1 (102a in FIG. 5) may be connected to a child of IAB 301b (IAB 301a) and WTRU2 (102b in FIG. 5) may be connected directly to the IAB 301b, may have radio bearers that may be delay-intolerant, and may be mapped 1:1 (e.g., all the way) to the donor DU (not shown in the figure, and which may be several hops away from the source/parent DU). That is, for the bearer of WTRU1 102a, there may be a dedicated BH RLC channel between IAB 301a and IAB 301b, and also between IAB 301b and its parent, and for the bearer of WTRU2 102b, there may be a dedicated BH RLC channel between IAB 301b and its parent.

In the case that (e.g., even if) a DAPS HO may be configured for IAB 301b (e.g., at least one of the bearers of the IAB MT may be configured for DAPS), as the PDCP of the bearers of WTRU1 102a and WTRU2 102b may be terminated at the respective WTRUs, after (e.g., once) the handover command is received at the IAB node:

UL data of bearers of WTRU1 102a and WTRU2 102b, which may be received at IAB 301b over the corresponding ingress BH RLC channels, may (e.g., have to) be buffered at the IAB 301b after (e.g., from the moment) the HO command may be received until the migration of IAB 301b toward the target is complete (e.g., RACH towards the target node may be complete, and the IAB node may sent the RRC Reconfiguration complete message).

DL data of bearers of WTRU1 102a and WTRU2 102b, which may be received at source DU 302a, may not be delivered to the IAB node 301b, as the source (e.g., only) may continue to transmit the DL data to the IAB MT DRBs configured for DAPS after sending the HO command.

Even in scenarios where (e.g., only) best effort bearers that may be mapped N:1 are concerned, the fact that DL data that may be buffered at the source node that may (e.g., have to) pass through the migrating IAB node may not be sent after (e.g., once) the handover command is sent to the IAB node, may mean that (e.g., all) the radio resources that may be used to transmit these buffered packets between the donor CU-UP and/or the source DU 302a (which may have involved several hops) may be a waste of resources, as these packets may (e.g., have to) be resent again all over the new path to the target DU 302b.

Methods for DAPS HO in IAB

Terminology

For the sake of brevity, most of the embodiments of this disclosure are described for an IAB node in a multi-hop IAB network (e.g., the MT part of an IAB node or/and the DU part of an IAB node). However, the embodiments are equally applicable to other kinds of nodes or devices, such as a traditional wireless device/WTRU 102, or a sidelink WTRU 102 acting as a WTRU-to-WTRU relay or WTRU-to-NW relay (e.g., over sidelink). Specifically, the terms IAB node 301, MT part of an IAB node, and DU part of an IAB node, and WTRU may be used interchangeably in this discussion.

A direct descendant or a child node of a certain IAB node 301 is an IAB node 301/WTRU 102 that may be directly connected to the IAB node 301 (e.g., a mobile terminal or node being served by the IAB node). In a multi-hop case, a given IAB node 301 may be referred to as serving a node/WTRU indirectly if the UL/DL traffic of the WTRU/node may (e.g., have to) traverse through the given IAB node 301, for example, before arriving at the WTRU/node (in the UL direction) or the donor node (in the DL direction). The generic term "descendant" may be used herein to refer to all the nodes/WTRUs that are directly or indirectly served by the IAB node 301.

Unless otherwise specified, reference to the IAB node 301 receiving or sending instructions/messages from the donor CU, means the MT of the concerned IAB node 301.

A packet that is terminated at the IAB node 301 may refer to a BAP packet received at the IAB MT that may contain a BAP routing ID that may have a BAP address that may be the same as the IAB node's BAP address. That is, the packet may contain any one of the following data:

F1-C message destined for the IAB-node's DU.

F1-C message that may contain SRB data for a WTRU 102 directly connected to the IAB node 301.

F1-U message that may contain DRB data for a WTRU 102 directly connected to the IAB node 301.

Packets that are destined for the IAB node's MT (e.g., SRB data, or data for an IAB DRB, if any) may not be transmitted via BH RLC channels, but rather via RLC access channels (like any WTRU connected to a DU), and thus may not be received at BAP layer.

Methods for DAPS in IAB

In the methods, techniques, schemes, and apparatus that follow, solutions are described for enabling DAPS HO of BH RLC channels during an IAB node 301 migration.

A BAP Entity Associated with More than One Backhaul Link

In one embodiment, the IAB node 301 (or specifically the BAP entity of the MT of the IAB node) may be associated with at least two addresses (e.g., in order) to support DAPS HO (referred to as source BAP address/source address and target BAP address/target address henceforth). During DAPS HO, the MT's BAP entity, (e.g., upon) receiving DL packets that may have a routing ID that may contain either the source or target BAP address, may determine (e.g., know) that the packet is destined for it, and thus may pass it on to upper layers, for example, instead of forwarding it to downstream nodes.

There are several ways in which the target BAP address may be communicated to the IAB node 301. For example:

The target address may be included in the DAPS HO command (e.g., in the bap-Address IE within the bap-Config IE that may be included in the RRCReconfiguration message)

The target address may be configured before the DAPS HO command may be received (e.g., bap-Config IE may be enhanced to contain an additional BAP address that may be used during DAPS HO)

The target BAP address may be derived from the source BAP address, e.g., according to a rule specified by 3GPP specification. For example, the last bit of the IAB node's BAP address may be switched from 1 to 0, or vice versa, to derive the BAP address. For example, if the IAB node's BAP address is 1000100001, in such a case (e.g., then) during DAPS HO, the IAB node 301 may also be addressed by 1000100000.

After (e.g., once) the DAPS HO is completed, the target BAP address may become the IAB node's BAP address, and the IAB node 301 may be addressed via that address from then on (until the next DAPS HO or reconfiguration that may result in BAP address change).

A Separate BAP Entity Associated with the Target Backhaul Link

In one embodiment, the IAB node 301 (or specifically the BAP entity of the MT of the IAB node), (e.g., upon) receiving a DAPS HO command, may establish a new BAP entity, which may use the BAP address indicated within the DAPS HO command while still maintaining the source BAP entity associated with the source parent node/backhaul link.

After (e.g., when) DAPS HO is completed, the IAB node 301 may release the BAP entity associated with the source, as well as the BH RLC channels under it.

Handling of UL Data

In one embodiment, after (e.g., once) the IAB node 301 has successfully established the random access procedure with the target, the IAB node 301 may inform the BAP entity, and, from there on, UL data may be pushed to the BH RLC channels associated with the target.

In another embodiment, UL data related to BH RLC channels that may be configured for DAPS HO may be sent via the source link (and associated BH RLC channels), for example, even after the random access with the target has been completed (for example, until the HO is complete).

That is, the IAB node 301 may simultaneously send UL data on both the source and target links. This may be performed in several way, for example:

the UL data may be duplicated over both link some UL data may be sent via the first link, while other data may be sent via the second link, and some data may be duplicated over both link the UL data may be sent over the link that may provide the scheduling grant. Akin to the operation of split bearers after (e.g., when) the data may be above the UL buffer split threshold, a threshold may be configured that indicates to the IAB node a case where (e.g., when) to start applying this behavior The UL behavior may be configured during the HO procedure (e.g., in the HO command), pre-configured before the HO (e.g. in a previous RRC reconfiguration message) and/or left to implementation.

DAPS HO Configured by the Parent Node

In one embodiment, the DAPS HO of an IAB node 301 may be configured by the parent node, rather than the DAPS HO configuration via the CU.

The parent node may forward the packets to the MT of the children IAB nodes transparently. The parent node may determine (e.g., know) whether the packet it is forwarding may be an RRC message or not, for example because RRC packets may be contained within F1-AP messages, but it may not determine (e.g., know) what kind of message it is (e.g., a HO message, a reconfiguration message that does not involve HO, etc.). In one embodiment, the CU may indicate (e.g., transmit information indicating) to the parent node (e.g., by an additional Information Element (IE) within the F1-AP message that may contain the RRC message) that the contained RRC message may be a HO message. The parent node may in such a case (e.g., then) decide whether to trigger DAPS HO for some of the BH RLC channels or not, and may indicate (e.g., transmit information indicating) that to the child node. For example, the parent node may send a new BAP Control PDU to the child node that may contain the list of the BH RLC channels to be configured for DAPS HO before forwarding the RRC message that may contain the HO command to the child node.

DAPS HO Based on Load Conditions

In one embodiment, the decision to perform DAPS HO or not may be determined based on UL/DL load/buffer conditions at the IAB node 301 or/and at the source parent node 302a. For example, a DAPS HO may be initiated if the pending/buffered DL data at the source parent node 302a that may (e.g., have to) be forwarded to the migrating IAB node 301 is above or below a certain threshold. One threshold may be configured for the total pending DL data, or there may be a threshold associated with any (e.g., each) BH RLC channel.

Impacts on Downstream Nodes/WTRUs

In one embodiment, the IAB node 301 may take actions that, depending on whether DAPS HO is configured or not, may impact the behavior of descendant nodes/WTRUs 102.

For example, the IAB node 301 may inform downstream nodes (e.g., via a BAP Control PDU) that it has started a HO procedure, and whether the HO is a DAPS HO (and, if so, which BH RLC channel between the IAB node 301 and the child node may be mapped to the BH RLC channels between the IAB node 301 and its own parent that may be configured for DAPS HO). The IAB node 301 also may inform child nodes in a case where (e.g., when) the HO procedure is completed. This information may be used by the downstream nodes to take specific action. For example, the child nodes may route UL data via an alternate link/route during the period that the IAB node 301 is involved in a HO. In one example, whether to use the alternate link/route may depend on the DAPS HO configuration (e.g., use alternate link/ routes for BH RLC channels that may be impacted by the DAPS HO while using the current link/route with the source parent for other BH RLC channels, or vice versa). In another example, the action taken may affect all BH RLC channel (e.g., use alternate link/route for all traffic until HO is completed). The exact action to be taken may be pre-configured at the children nodes (e.g. previous RRC Recon-figuration, OAM, etc.), specified in 3GPP standards or it can be left to implementation.

The IAB node 301 may send more explicit information or instruction to the child nodes, instead of or in addition to an indication of a HO or the type of HO. For example, on receiving a HO command, the IAB node may explicitly instruct its child nodes (e.g., using a BAP Control PDU) to change the route of some BH RLC Channels to another link (wherein the information about the new link may be included in the message, and separate link information could be provided for any (e.g., each) BH RLC channel). Simi-larly, after (e.g., upon) HO completion, the IAB node 301 may instruct the child nodes to restore the previous/original route/link.

security requirements of 3GPP, the security keys between the WTRU 102 and the network may (e.g., have to) be refreshed.

In one embodiment, the DAPS HO of an IAB node 301 may also trigger DAPS HO of any WTRU 102 that may be directly being served by the IAB node 301.

In another embodiment, the DAPS HO of an IAB node 301 may also trigger DAPS HO of any WTRU 102 that may be indirectly being served by the IAB node 301.

Configuration of BH RLC Channels for DAPS HO

After (e.g., when) an IAB node 301 receives a HO command, any number (e.g., one or more) of the BH RLC channels that may be handed over from the source to the target may be configured for DAPS HO.

Several options may be provided below for configuring DAPS HO applicability of BH RLC channels.

Option 1:

Modify the BH-RLC-ChannelConfig IE to include the daps-Config IE, where setting the value to true may indicate DAPS HO is to be applied for the corresponding BH RLC channel, as shown below (last element).

```
BH-RLC ChannelConfig-r16::= SEQUENCE {
    bh-LogicalChannelIdentity-r16          BH-LogicalChannelIdentity-r16 OPTIONAL,    -- Cond LCH-
Setuponly
    bh-RLC-ChannelID-r16                    BH-RLC-ChannelID-r16,
    reestablishRLC-r16                      ENUMERATED {true}            OPTIONAL,    -- Need N
    rlc-Config-r16                          RLC-Config                   OPTIONAL,    -- Cond LCH-Setup
    mac-LogicalChannelConfig-r16            LogicalChannelConfig         OPTIONAL;    -- Cond LCH-Setup
    ...,
    daps-Config-r17                         ENUMERATED{true}             OPTIONAL     -- Need N
}
```

In one example, IAB nodes 301 may be configured with backup parents/links (e.g., which can be a node configured as the secondary node for the IAB node, but not actively used). After (e.g., when) an IAB node 301 receives a Option 2:

In the CellGroupConfig IE, add a list that may indicate which BH RLC channels are to be configured for DAPS HO, as shown below:

```
bh-RLC-ChannelDAPS_ConfigList-r17    SEQUENCE (SIZE (1..maxBH-RLC-ChannleID-r16) ) OF BH-
LogicalChannelIdentity-r16 OPTIONAL,    -- Need N
``` message from a parent node that it is involved in a HO, it may start routing UL data using the alternate route until another message is received indicating that the HO is completed. The routing may depend on the HO type (e.g., use the alternate route if the HO is not DAPS HO, use the alternate route (e.g., only) for the BH RLC channels that may not be configured for DAPS HO, use the alternate route regardless of the HO type, etc.).

Impact of DAPS HO of an IAB Node on a WTRU Directly Served by the IAB Node

If an IAB node 301 performs a DAPS HO that also may involve a change of the donor CU, it can be assumed that the CU of the WTRUs under the IAB node 301 may also be changed. That is, even if the backhaul link between the WTRU 102 and the migrating IAB node 301 may not change after the migration of the IAB node 301 (e.g., the same cell group configuration, lower layer configuration for the RLC/MAC entities, the same WTRU 102 parameters such as C-RNTI (Cell-Radio Network Temporary Identifier), etc.), the WTRU 102 may (e.g., have to) perform a reconfiguration with sync, for example, as the PDCP termination point is now relocated to the target donor CU, and/or as per the Option 3:

The DAPS HO configuration may be indicated to the IAB MT at an RRC Reconfiguration message level (or at the CellGroupConfig level within the RRC Reconfiguration), indicating that DAPS HO may be to be applied for every BH RLC channel that may be handed over.

In one sub-embodiment, if there are some BH RLC channels that should not apply DAPS HO, there may be an indication in the BH RLC channel configuration of the concerned BH RLC channels indicating that DAPS HO may not to be applied for these channels.

An example is shown below:

```
RRCReconfiguration message:
---- a field added: daps-Config-r17      ENUMERATED{true}
BH-RLC-ChannelConfig IE:
--- a field added: daps-Config-r17       ENUMERATED{true, false}
```

Option 4:

The IAB node 301 may be (pre)configured regarding which BH RLC channels should apply DAPS HO or not. Some examples include:

BH RLC channels that may have a certain 5QI Quality of Service (QoS) setting (e.g., corresponding to URLLC) may use DAPS HO, unless specified otherwise in the HO command.

BH RLC channels that may have a certain 5QI QoS setting (e.g., corresponding to GBR) may not use DAPS HO, unless specified otherwise in the HO command.

BH RLC channels that may be mapped one-to-one to WTRU DRBs may use DAPS HO, unless specified otherwise in the HO command.

BH RLC channels that may be mapped many-to-one to WTRU DRBs may not use DAPS

HO, unless specified otherwise in the HO command.

BH RLC channels that may be mapped to control plane message (e.g., F1-AP messages, RRC messages, etc,) may use DAPS HO, unless specified otherwise in the HO command.

BH RLC channels that may be mapped to packets destined to a particular destination IAB node may use or may not use DAPS HO, unless specified otherwise in the HO command.

The IAB node 301 may receive the configuration of BH RLC channels and the applicability of DAPS HO in any number (e.g., one or more) of the following ways:

explicitly indicated during the IAB integration procedure (e.g., specifying the handling of control plane messages, BH RLC channels with a given 5Q1, BH RLC channels that are mapped 1-to-1, etc.);

explicitly indicated during the setup or modification of the BH RLC channel (e.g., an indicator indicating that the BH RLC channel may or may not employ DAPS HO during the IAB node migration unless otherwise specified);

OAM; and left to implementation.

Relation between DAPS HO for BH RLC Channels and DAPS HO for IAB-MT DRBs

In one embodiment, the DAPS HO for IAB MT's DRBs and BH RLC may be independent, e.g., any (e.g., each) may (e.g., have to) be configured separately.

In another embodiment, if DAPS HO is configured for any BH RLC channel, DAPS HO may be (e.g. assumed) for the IAB MT's DRBs.

In yet another embodiment, if DAPS HO is configured for IAB MT's DRB, DAPS HO may be (e.g., assumed) for the BH RLC channels.

Capability Aspects

In one embodiment, new capability indication(s) may be introduced that indicate whether an IAB node 301 may support DAPS HO or not. There are several possibilities, including:

One capability indicator indicating whether DAPS HO is supported for both BH RLC channels and/or for the IAB MT's DRB.

One capability indicator indicating whether DAPS HO is supported for BH RLC channels, and/or another indicator indicating whether DAPS HO is supported for the IAB MT's DRBs The indicator for the support of the DAPS HO for the IAB MT's DRBs may be a new indicator or the rel-16 WTRU capability indicator for DAPS HO.

Procedures for Realizing DAPS HO of BH RLC Channels

In one embodiment, after (e.g., when) an IAB node 301 receives a HO command (e.g., RRCReconfiguration message containing reconfigurationVVithSync) that may contain an indication that any number (e.g., one or more) of BH RLC channels are going to be involved in DAPS HO (or if a previous configuration has already indicated that DAPS HO is to be applied for any number (e.g., one or more) of the BH RLC channels), it may perform the following steps:

Create a MAC entity for the target, for example, while keeping the MAC entity with the source.

Establish an RLC entity and an associated logical channel for the target for any (e.g., each) BH RLC channel configured with DAPS, and configure them with the configuration provided in the HO command (e.g., the BH-RLC-ChannelConfig corresponding to the entry in the bh-RLC-ChannelToAddModList within the cell-GroupConfig).

Temporarily maintain two BAP addresses, for example, one corresponding to the BAP address used in the source and another one corresponding to the new address received in the HO command. This may enable the IAB node to be able to receive from both the source and target simultaneously, concerning packets that may be terminated at itself After (e.g., when) packets are received from the target, the new BAP address may be used to determine if the packets are terminated at this IAB node or not.

In some cases, the two BAP addresses may be the same (e.g., intra-donor CU migration is being performed).

Retain the rest of the source configurations (including the BAP address configured by source), for example, until instructed to release the source.

EXEMPLARY EMBODIMENT

Figure 6:
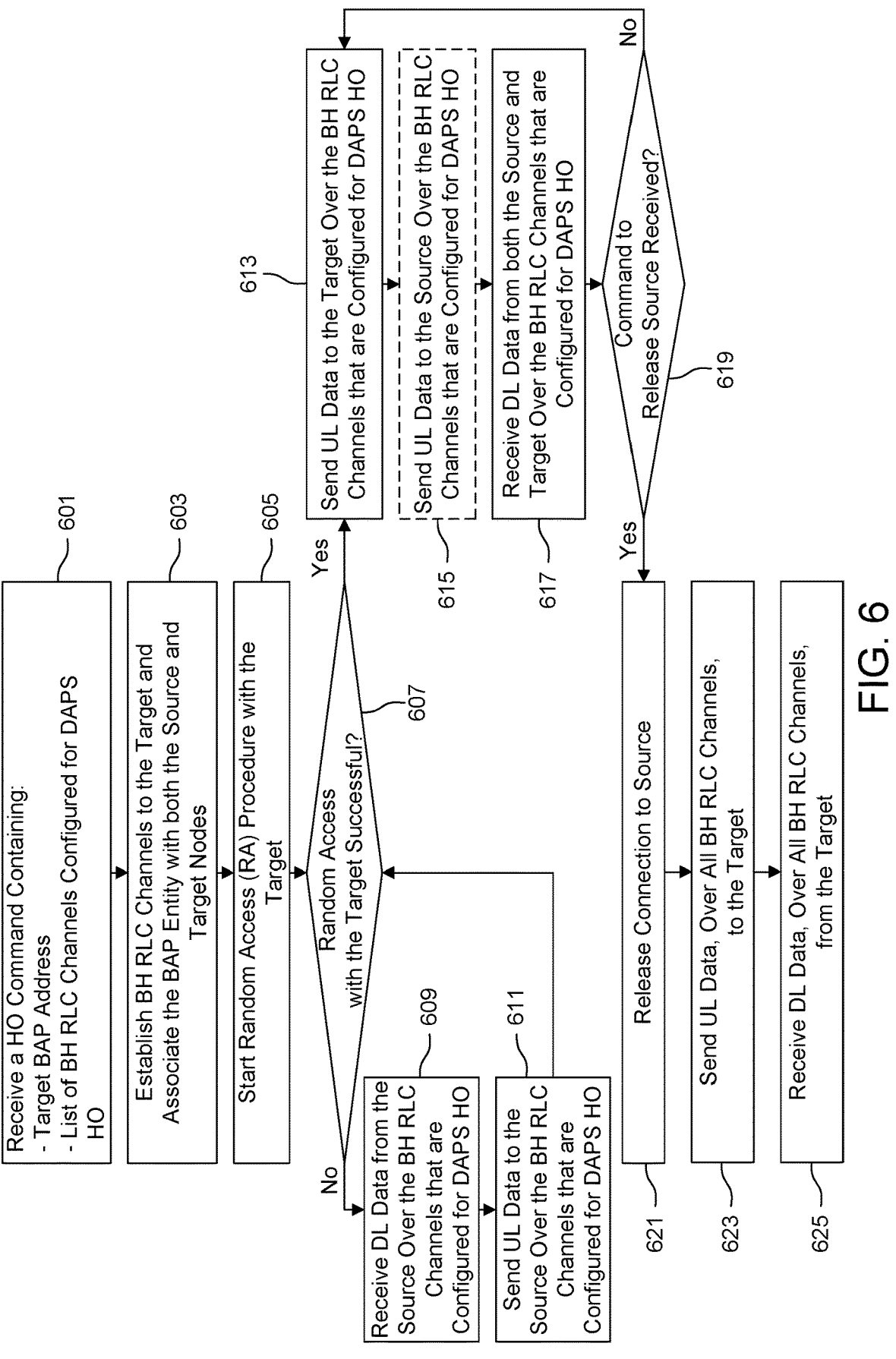
FIG. 6 is a flow chart illustrating DAPS handover in IAB in accordance with an embodiment.

FIG. 6 is a flow chart illustrating one exemplary embodiment for performing handover of an IAB node 301 from a source parent node 302*a* to a target parent node 302*b*, in a wireless network. Initially, an IAB node 301 may receive a handover command that may include the BAP address of the target parent node for the handover and/or a list of BH RLC channels that may be configured for DAPS HO (601). In response, the IAB node 301 may establish the BH RLC channels to the target parent node 302*b* and/or may associate the BAP entity with both its source parent node 302*a* and the target parent node 302*b* (603). The IAB node 301 (e.g., then) may in such a case start a RACH procedure with the target parent node 302*b* (605).

In step 607, if the RACH procedure is unsuccessful, flow may proceed to steps 609 and 611 in which the IAB node 301 may receive downlink data from the source parent node 302*a* over the previously configured BH RLC channels (that may be configured for DAPS HO) and may send uplink data to the source parent node 302*a* over the previously configured BH RLC channels for DAPS HO, respectively. The IAB node 301 may continue to check whether the RACH procedure with the target parent node 302*b* was successful (e.g., return to step 607 in the flowchart) until it is successful. Of course, it is understood that the RACH procedure may never be successful (e.g., fail repeatedly until a RACH timer expires), but the flowchart may not demonstrate processing should the RACH procedure fail since such processing is not relevant to the present subject matter and would be well understood by those of skill in the related arts.

If and/or after (e.g., when) the RACH procedure with the target parent node 302*b* is successful, flow may proceed from step 607 to step 613. After (e.g., upon) successful RACH, the IAB node 301 may send (e.g., start sending) its uplink data to the target parent node 302*b* over the BH RLC channels that may be configured for DAPS HO (613) and may continue to send the same uplink data to the source parent node 302a over the BH RLC channels that may be configured for DAPS HO (615), Furthermore, it may receive downlink data from both the source parent node 302a and the target parent node 302b over the BH RLC channels configured for DAPS HO (617), for example, until it receives a command to release the source parent node 302a. Thus, in step 619, the IAB node 301 may determine whether or not it has received such a command. If not, the IAB node 301 may continue to send and receive data to/from both the source parent node 302a and the target parent node 302b (steps 613, 615, 617).

After (e.g., when) the IAB node 301 receive the release command, flow may proceed to step 621, 623, and 625, in which the IAB node 301 may release the connection to the source parent node 302a (621), may continue to send its uplink data to the target parent node 302b, but may use (e.g., now using) (e.g., all of) the corresponding BH RLCs channels (623), and may continue to receive downlink data from the target parent node 302b, but may use (e.g., now using) (e.g., all of) the corresponding BH RLC channels (step 625).

FIG. 7 is a flowchart illustrating a representative method of performing a handover by a (e.g., relay) WTRU 301 from a source parent WTRU 302a to a target parent WTRU 302b in a wireless network. Referring to FIG. 7, the representative method 700 may include, at block 710, obtaining uplink data determining, a channel quality for a first link between the relay WTRU and the source parent WTRU 302a, and a channel quality for a second link between the relay WTRU and the target parent WTRU 302b. At block 720, the (e.g., relay) WTRU 301 may send the uplink data via the first link and the second link based on any of: (1) the determined channel quality for the first link, (2) the determined channel quality for the second link, and/or (3) load conditions. At block 730, the (e.g., relay) WTRU 301 may send, to a child WTRU served by the relay WTRU via a third link, information indicating a handover of the relay WTRU from the source parent WTRU 302a to the target parent WTRU 302b.

In certain representative embodiments, the obtained uplink data may be: (1) received from the child WTRU, (2) received from a further WTRU and/or (3) generated by the relay WTRU.

In certain representative embodiments, the (e.g., relay) WTRU 301 may send, to the child WTRU, information indicating to send uplink data by the child WTRU to a further WTRU via a fourth link during the handover of the relay WTRU to the target parent WTRU 302b.

In certain representative embodiments, the (e.g., relay) WTRU 301 may send, to the child WTRU, information indicating any of: (1) a completion of the handover of the relay WTRU to the target parent node, and/or (2) to send uplink data by the child WTRU to the relay WTRU via the third link.

In certain representative embodiments, the (e.g., relay) WTRU 301 may receive, information indicating a handover configuration; and/or may establish the second link between the relay WTRU and the target parent WTRU 302b using the received information indicating the handover configuration.

In certain representative embodiments, the (e.g., relay) WTRU 301 may buffer uplink data by the relay WTRU prior to the sending of the uplink data, and the load conditions may be determined based on the buffered uplink data.

In certain representative embodiments, the (e.g., relay) WTRU 301 may be an IAB node.

In certain representative embodiments, the source parent WTRU 302a may be a source parent IAB node and the target parent WTRU 302b may be a target parent IAB node.

In certain representative embodiments, the source parent WTRU 302a may be a first parent IAB donor and the target parent WTRU 302b may be a second parent IAB donor.

In certain representative embodiments, the first link may be between a mobile termination unit of the IAB node and a first DU of the source parent WTRU 302a, and/or the second link may be between the MT of the IAB node and a first DU of the target parent WTRU 302b.

In certain representative embodiments, the handover configuration may indicate one or more BH RLC channel transmissions associated with the first link, and/or the uplink data may be sent via the one or more BH RLC channel transmissions associated with the first link.

In certain representative embodiments, the handover configuration may indicate one or more BH RLC channel transmissions associated with the second link, and/or the uplink may be sent via the one or more BH RLC channel transmissions associated with the second link.

In certain representative embodiments, the (e.g., relay) WTRU 301 may receive, a downlink packet via the first link or the second link; the (e.g., relay) WTRU 301 may determine, a routing identifier associated with the downlink packet; and/or the (e.g., relay) WTRU 301 may determine, for example on condition that the routing identifier associated with the downlink packet corresponds to any of a source address associated with the source parent WTRU 302a and a target address associated with the target parent WTRU 302b, that the downlink packet is addressed to the relay WTRU.

In certain representative embodiments, the (e.g., relay) WTRU 301 may receive information indicating a release of the first link; and/or may release the first link associated with the source parent WTRU 302a.

In certain representative embodiments, the (e.g., relay) WTRU 301 may determine the target address based on any of: (1) a handover configuration received by the relay WTRU, (2) a pre-configuration of the relay WTRU with the target address; and/or (3) a derivation, by the relay WTRU, of the target address from the source address.

In certain representative embodiments, the (e.g., relay) WTRU 301 may comprise a BAP entity associated with the source address and/or the target address.

Figure 8:
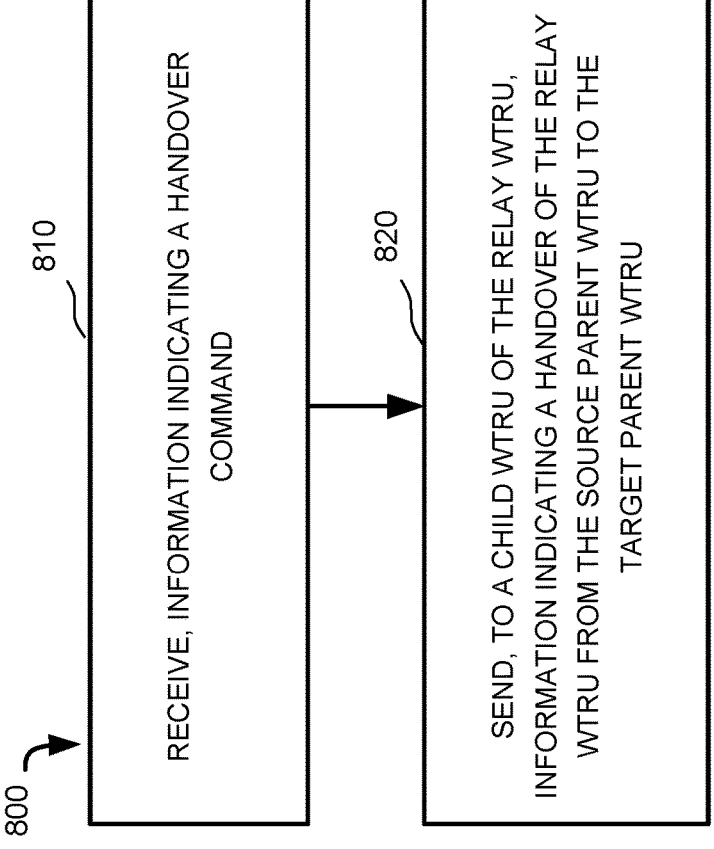
FIG. 8 is a flowchart illustrating a further representative method of performing a handover of an IAB node by a WTRU from a source parent node to a target parent node in a wireless network.

FIG. 8 is a flowchart illustrating a further representative method of performing a handover by a (e.g., relay) WTRU 301 from a source parent WTRU 302a to a target parent WTRU 302b in a wireless network. Referring to FIG. 8, the representative method 800 may include, at block 810, receiving, information indicating a handover command. At block 820, the (e.g., relay) WTRU 301 may send, to a child WTRU of the relay WTRU, information indicating a handover of the relay WTRU from the source parent WTRU 302a to the target parent WTRU 302b.

In certain representative embodiments, the (e.g., relay) WTRU 301 may be an IAB node.

In certain representative embodiments, the (e.g., relay) WTRU 301 may be a User Equipment (UE).

In certain representative embodiments, the source parent WTRU 302a may be a first parent IAB node and/or the target parent WTRU 302b may be a second parent IAB node.

In certain representative embodiments, the source parent WTRU 302a may be a first parent IAB donor and/or the target parent WTRU 302b may be a second parent IAB donor.

Figure 9:
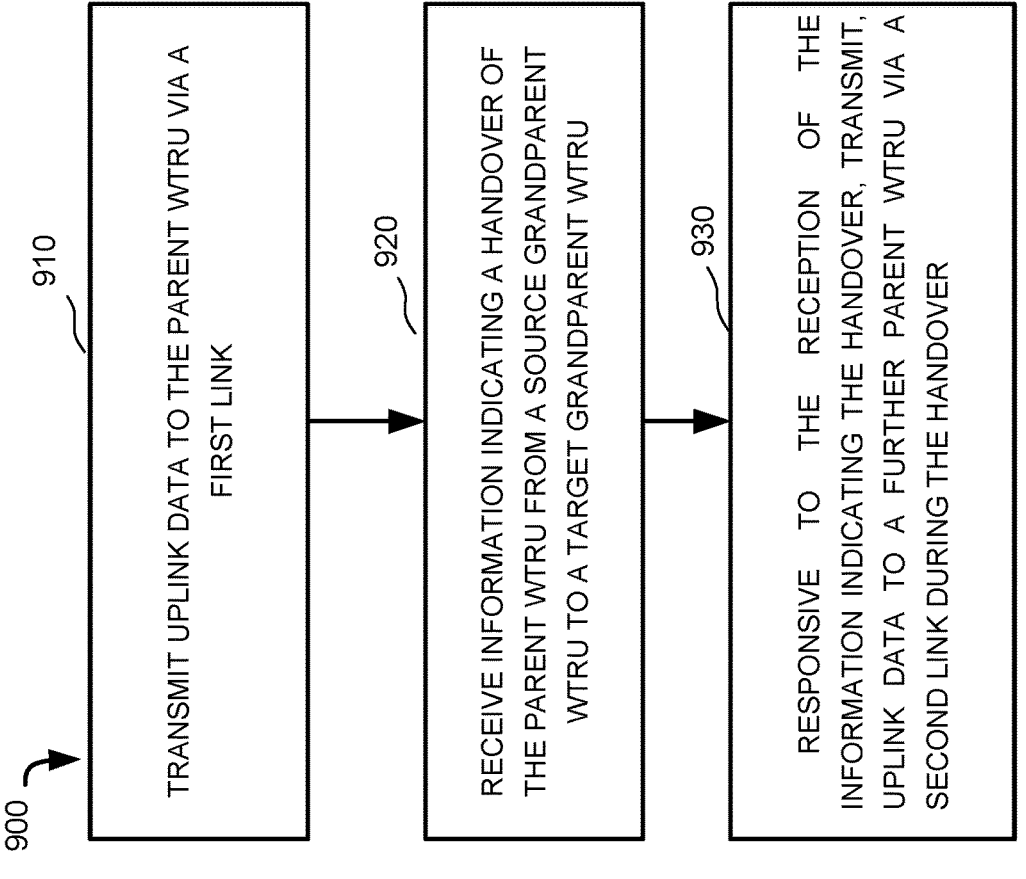
FIG. 9 is a flowchart illustrating a representative method of informing a child WTRU of a handover of a parent WTRU from a source grandparent WTRU to a target grandparent WTRU.

FIG. 9 is a flowchart illustrating a representative method of informing a child WTRU of a handover, implemented by a child WTRU, wherein the child WTRU is a child WTRU to a parent WTRU 301, the method comprising. Referring to FIG. 9, the representative method 900 may include, at block 910, transmitting, uplink data to the parent WTRU via a first link. At block 920, the child WTRU may receive, information indicating a handover of the parent WTRU 301 from a source grandparent WTRU 302*a* to a target grandparent WTRU 302*b*. At block 930, the child WTRU may, responsive to the reception of the information indicating the handover, transmit, uplink data to a further parent WTRU 301 via a second link during the handover.

In certain representative embodiments, the child WTRU may receive, information indicating a completion of the handover from the parent WTRU 301; and/or may transmit uplink data to the parent WTRU 301, for example, via the first link (e.g., based on the received information indicating a completion of the handover).

In certain representative embodiments, the child WTRU may be an Integrated IAB child node, and the parent WTRU 301 may be a IAB parent node.

In certain representative embodiments, the source grandparent WTRU 302*a* may be a first grandparent IAB node and/or the target grandparent WTRU 302*b* may be a second grandparent IAB node.

In certain representative embodiments, the source grandparent WTRU 302*a* may be a first grandparent IAB donor and/or the target grandparent WTRU 302*b* may be a second grandparent IAB donor.

In certain representative embodiments, the first link may be associated with a first set of one or more Backhaul (BH) Radio Link Control RLC channel transmissions between the child IAB node and the parent IAB node, and/or the second link may be associated with a second set of one or more BH RLC channel transmissions between the child IAB node and the parent IAB node.

FIG. 10 is a flowchart illustrating a representative method of performing a handover of an IAB node 301 from a source parent node 302*a* to a target parent node 302*b* in a wireless network. Referring to FIG. 10, the representative method 1000 may include, at block 1010, the IAB node associating with the source parent node using a source BAP address and associating with the target parent node using a target BAP address. At block 1020, the IAB node may receive a downlink packet. At block 1030, the IAB node may determine a routing identifier associated with the downlink packet. At block 1040, the IAB node, for example responsive to the routing identifier associated with the packet corresponding to one of the source BAP address and the target BAP, may pass the downlink packet to a higher protocol stack layer for processing.

In certain representative embodiments, the IAB node, for example responsive to the routing identifier associated with the packet not corresponding to one of the source BAP address and the target BAP, may forward the data to another network node.

In certain representative embodiments, the IAB node may determine the target BAP node address by any of: receiving it in a Dual Active Protocol Stack (DAPS) handover (HO) command; being preconfigured with the target BAP address; and/or deriving the target BAP address from the source BAP address.

In certain representative embodiments, the method may further comprise: receiving a DAPS HO command; and/or for example responsive to receiving the DAPS HO command, establishing a BAP entity corresponding to the target BAP address.

In certain representative embodiments, the method may further comprise, for example responsive to completion of a DAPS HO, releasing the BAP entity corresponding to the source BAP address.

In certain representative embodiments, the DAPS HO command may be received from a donor CU and/or may indicate that the DAPS HO to be applied for a subset of BH RLC channels.

In certain representative embodiments, the method may further comprise, receiving, for example from a parent node, an indication that DAPS HO is to be applied for a subset of the BH RLC channels in an upcoming HO.

Figure 11:
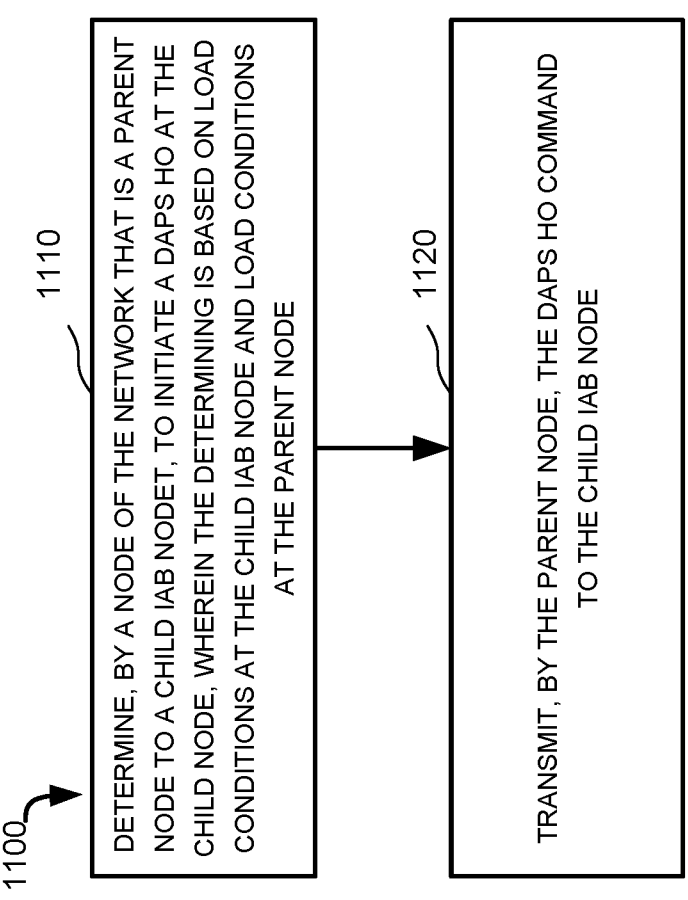
FIG. 11 is a flowchart illustrating a further representative method of performing handover of an IAB node from a source parent node to a target parent node in a wireless network.

FIG. 11 is a flowchart illustrating a representative method of performing handover of an IAB node 301 from a source parent node 302*a* to a target parent node 302*b* in a wireless network. Referring to FIG. 11, the representative method 1100 may include, at block 1110, a node of the network that is a parent node to a child IAB node determining to initiate a DAPS HO at the child node, for example, wherein the determining is based on load conditions at the child IAB node and/or load conditions at the parent node. At block 1120, the parent node may transmit the DAPS HO command to the child IAB node.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D, 2-5.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components header header

32 herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A method, implemented by a relay device, performing handover from a first node-to a second node in a wireless network, comprising:

receiving information indicating a handover command;

determining, based on measurements by the relay device, a channel quality for a first link between the relay device and the first node, and a channel quality for a second link between the relay device and the second node;

performing the handover at the relay device based on the determination of channel quality of the first link and the second link;

during the handover, sending uplink data via the first link and the second link based on any of: (1) the determined channel quality for the first link, (2) the determined channel quality for the second link, and/or (3) an uplink data buffer occupancy at the relay device; and sending, to a wireless transmit/receive unit (WTRU) served by the relay device via a third link, information indicating a completion of the handover of the relay device from the first node to the second node.

2. The method according to claim 1, wherein the uplink data comprises any of: (1) uplink data received from the WTRU served by the relay device, (2) uplink data received from a further WTRU and/or (3) uplink data generated by the relay device.

3. The method according to claim 1, further comprising receiving a message indicating to release the first link with the first node; and releasing the first link with the first node.

4. The method according to claim 1, further comprising:

sending, to the WTRU served by the relay device, information indicating any of: (1) to send uplink data by the WTRU to another WTRU during the handover, and/or (2) to send uplink data by the WTRU to the relay device via the third link, on completion of the handover.

5. The method according to claim 1, further comprising:

receiving information indicating a handover configuration;

sending a request to establish the second link between the relay device and the second node using the received information indicating the handover configuration, wherein the handover configuration indicates one or more backhaul (BH) radio link control (RLC) channels associated with the first link, and further comprising sending the uplink data via the one or more BH RLC channels associated with the first link, and/or wherein the handover configuration indicates one or more BH RLC channels associated with the second link, and further comprising sending the uplink data via the one or more BH RLC channels associated with the second link.

6. The method according to claim 1, further comprising:

receiving a downlink packet via the first link or the second link;

determining a routing identifier associated with the downlink packet; and determining, on condition that the routing identifier associated with the downlink packet corresponds to any of a first-address associated with the first node and a second address associated with the second node, that the downlink packet is addressed to the relay device.

7. The method according to claim 6, further comprising determining the second address based on any of: (1) a handover configuration received by the relay device, (2) a pre-configuration of the relay device with the second address; and/or (3) a derivation from the first address by the relay device.

8. The method according to claim 1, wherein the relay device is an integrated access and backhaul (IAB) node, and/or the first node is a first IAB donor and the second node is a second IAB donor.

9. The method according to claim 1, wherein the first link is between a mobile termination unit of the IAB node and a distributed unit of the first node, and the second link is between the mobile termination unit of the IAB node and a distributed unit of the second node.

10. The method according to claim 1, wherein the relay device is a WTRU.

11. A relay device configured for performing handover from a first node to a second node in a wireless network, the relay device comprising a processor and a transmitter/receiver unit configured to:

receive information indicating a handover command;

determine, based on measurements by the relay device, a channel quality for a first link between the relay device and the first node, and a channel quality for a second link between the relay device and the second node;

perform the handover at the relay device based on the determination of channel quality of the first link and the second link;

during the handover, send uplink data via the first link and the second link based on any of: (1) the determined channel quality for the first link, (2) the determined channel quality for the second link, and/or (3) an uplink data buffer occupancy at the relay device; and send, to a wireless transmit/receive unit (WTRU) served by the relay device via a third link, information indicating a completion of the handover of the relay device from the first node to the second node.

12. The relay device according to claim 11, wherein the uplink data comprises any of: (1) uplink data received from the WTRU served by the relay device, (2) uplink data received from a further WTRU and/or (3) uplink data generated by the relay device.

13. The relay device according to claim 12, wherein the first link is between a mobile termination unit of the IAB node and a distributed unit of the first node, and the second link is between the mobile termination unit of the IAB node and a distributed unit of the second node.

14. The relay device according to claim 11, wherein the transmitter/receiver unit is further configured to receive a message indicating to release the first link with the first node; and release the first link with the first node.

15. The relay device according to claim 11, wherein the transmitter/receiver unit is further configured to send, to the WTRU served by the relay device, information indicating any of: (1) to send uplink data by the WTRU to another WTRU during the handover, and/or (2) to send uplink data by the WTRU to the relay device via the third link, on completion of the handover.

16. The relay device according to claim 11, wherein the transmitter/receiver unit is further configured to:

receive information indicating a handover configuration;

send a request to establish the second link between the relay device and the second node using the received information indicating the handover configuration, wherein the handover configuration indicates one or more backhaul (BH) radio link control RLC) channels associated with the first link, and further comprising sending the uplink data via the one or more BH RLC channels associated with the first link, and/or wherein the handover configuration indicates one or more BH RLC channels associated with the second link, and further comprising sending the uplink data via the one or more BH RLC channels associated with the second link.

17. The relay device according to claim 11, wherein:

the transmitter/receiver unit is further configured to:

receive a downlink packet via the first link or the second link;

wherein the processor is further configured to:

determine a routing identifier associated with the downlink packet; and determine, on condition that the routing identifier associated with the downlink packet corresponds to any of a first address associated with the first node and a second address associated with the second node, that the downlink packet is addressed to the relay device.

18. The relay device according to claim 17, wherein the processor is further configured to determine the second address based on any of: (1) a handover configuration received by the relay device, (2) a pre-configuration of the relay device with the second address; and/or (3) a derivation from the first address by the relay device.

19. The relay device according to claim 11, wherein the relay device is an integrated access and backhaul (IAB) node, and/or the first node is a first IAB donor and the second node is a second IAB donor.

20. The relay device according to claim 11, wherein the relay device is a WTRU.

* * * * *